US008375975B2

(12) United States Patent
Busani

(10) Patent No.: US 8,375,975 B2
(45) Date of Patent: Feb. 19, 2013

(54) LOAD SENSING DIRECTIONAL CONTROL VALVE WITH AN ELEMENT HAVING PRIORITY UNDER SATURATION CONDITIONS

(75) Inventor: Ulderico Busani, Reggio Emilia (IT)

(73) Assignee: Walvoil S.p.A., Reggio Emilia (IT)

( * ) Notice: Subject to any disclaimer, the term of this patent is extended or adjusted under 35 U.S.C. 154(b) by 434 days.

(21) Appl. No.: 12/666,754

(22) PCT Filed: Jun. 26, 2007

(86) PCT No.: PCT/IT2007/000449

§ 371 (c)(1),
(2), (4) Date: Dec. 24, 2009

(87) PCT Pub. No.: WO2009/001377

PCT Pub. Date: Dec. 31, 2008

(65) Prior Publication Data

US 2010/0176324 A1 Jul. 15, 2010

(51) Int. Cl.
*G05D 11/03* (2006.01)

(52) U.S. Cl. .......... 137/118.04; 91/446; 91/447; 91/516

(58) Field of Classification Search ............. 137/118.01, 137/118.04, 118.06, 596, 102; 91/446, 516, 91/447
See application file for complete search history.

(56) References Cited

U.S. PATENT DOCUMENTS 3,703,186 A * 11/1972 Brewer ......................... 137/101
3,937,129 A 2/1976 Miller
4,206,689 A * 6/1980 Peterson ......................... 91/516
4,488,569 A * 12/1984 Rau .............................. 137/101
5,138,837 A 8/1992 Obertrifter et al.
5,398,594 A * 3/1995 Tischer et al. .................. 91/516
5,487,403 A * 1/1996 Mollo ...................... 137/115.16
6,895,852 B2 * 5/2005 Pieper ............................ 91/516
7,182,097 B2 2/2007 Busani
2003/0121256 A1 7/2003 Mather

FOREIGN PATENT DOCUMENTS

EP 1 628 018 2/2006
WO 2007/116035 10/2007

OTHER PUBLICATIONS

International Search Report dated Feb. 29, 2008, from corresponding PCT application.

* cited by examiner

*Primary Examiner* — John Fox
*Assistant Examiner* — Kevin Murphy
(74) *Attorney, Agent, or Firm* — Young & Thompson

(57) ABSTRACT

The invention relates to the field of load sensing, flow sharing directional control valves for controlling an operating machine, such as an excavator. The directional control valve of the present invention is particularly characterized by the addition of at least one element (E4) wherein the provision of a bore (16) and the replacement of components (30), (50), (M1) with a compensator (9), having a spring (14) operating on one side thereof (9*a*), and a piston/load sensing signal selector (8) impart to this single element (E4) the feature of non participating in flow-rate reduction under saturation conditions, while preserving the feature of maintaining a constant flow-rate to the user, irrespective of the variation of the load.

3 Claims, 5 Drawing Sheets

Figure 1:
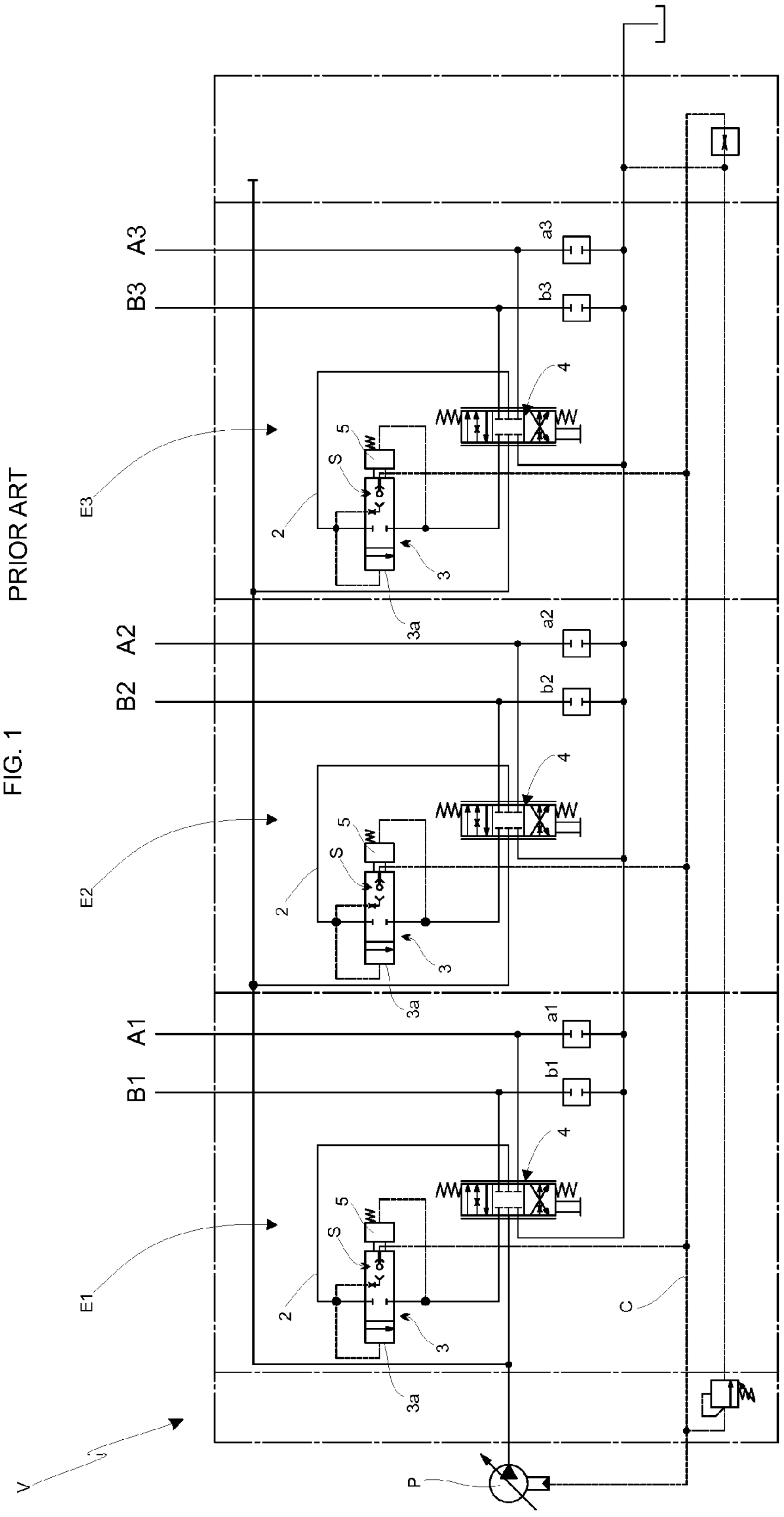
FIG. 1 PRIOR ART

LOAD SENSING DIRECTIONAL CONTROL VALVE WITH AN ELEMENT HAVING PRIORITY UNDER SATURATION CONDITIONS

This invention relates to a sectional directional control valve, particularly a load-sensing, flow-sharing directional control valve.

In operating machines with this type of hydraulic circuit, under saturation conditions, i.e. when the global flow-rate required by the various elements exceed the maximum pump-flow-rate, the pump cannot keep a constant pressure differential, whereby a pressure drop occurs across all the elements, and causes a proportional flow-rate reduction at all the elements.

This feature is particularly needed in those operating machines, such as excavators, that are required to perform many simultaneous movements, as it affords proper control of the moving machine even under saturation conditions, which occur quite often.

Nevertheless, amongst the various functions of an operating machine, each one being controlled by one element, there may be the need to exclude at least one of such functions from proportional flow-rate reduction, under saturation conditions, so that it has a fixed flow-rate value, although still irrespective of the load, according to the load sensing concept: the flow-rate will be still proportionally reduced across all the other elements except the element corresponding to the above function.

A classical example of this kind of need is given by excavators, in which turret rotation control is often required to be independent of the other functions.

A very simple well-known solution consists in providing a separate circuit, designed to only operate the function that is required to be independent (such as turret rotation).

However, this solution involves the major drawbacks of high costs and excessive space requirements.

The object of this invention is to provide a sectional directional control valve composed of two or more elements, at least one of which may be excluded from proportional flow-rate reduction under saturation conditions.

The present directional control valve has a bore in the element excluded from proportional flow-rate reduction, which is designed to transmit the pressure signal received from the pump to an intermediate chamber between a suitable local compensator and a suitable load sensing signal selector which are placed within the same lapped bore; this feature allows the element not to participate in flow-rate reduction under saturation conditions, while preserving the feature of maintaining a constant flow-rate to the user irrespective of the variation of the load.

One of the advantages of this solution is that the need of having at least one function not participating in flow-rate reduction is fulfilled without adding any circuit, but by simply introducing certain construction changes in the element dedicated thereto and replacing certain components mounted therein.

This leads to substantial cost reduction as well as lower overall space requirements of the valve as compared with prior art solutions.

These objects and advantages are all achieved by the directional control valve of this invention, which is characterized as set out in the annexed claims.

Figure 2:
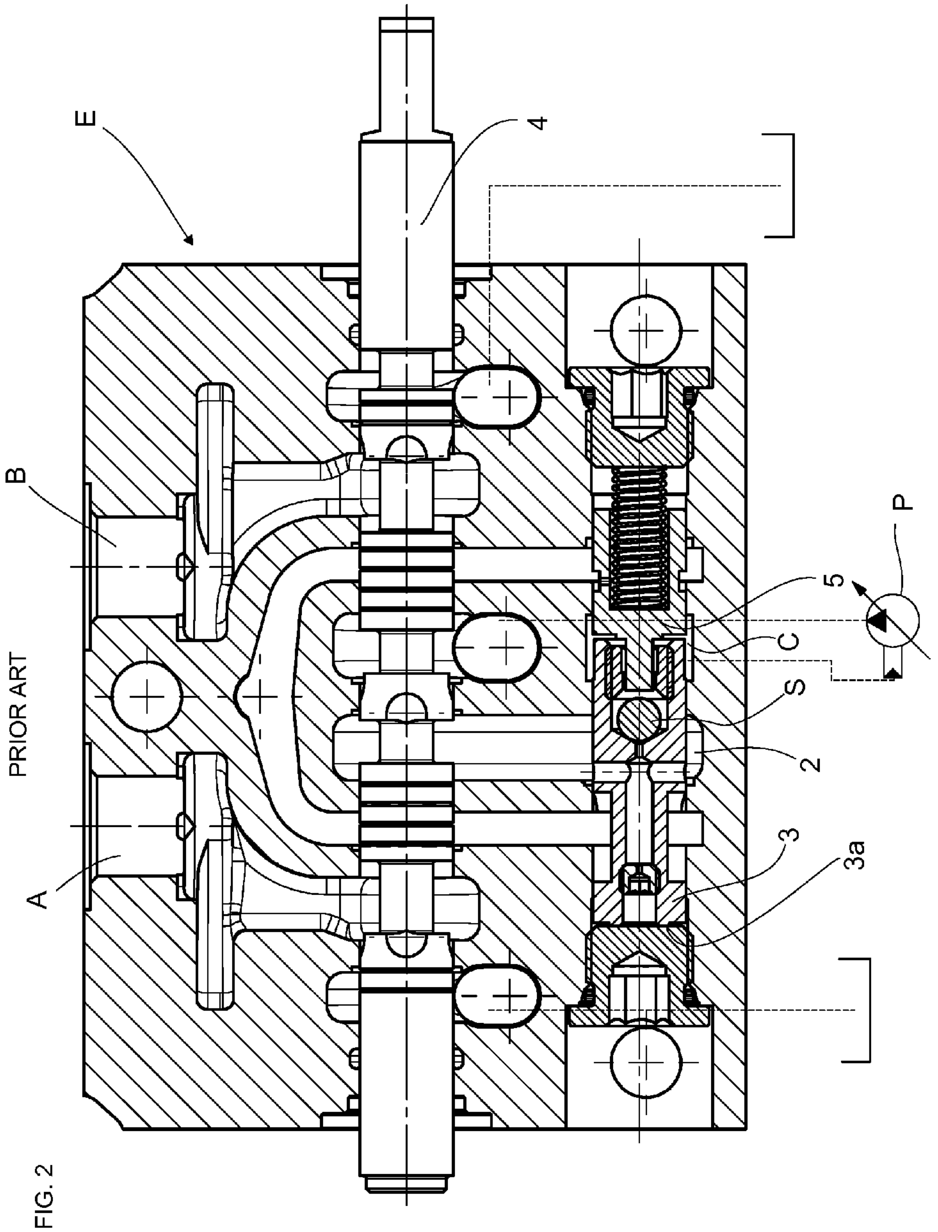
PRIOR ART FIG. 2
Figure 3:
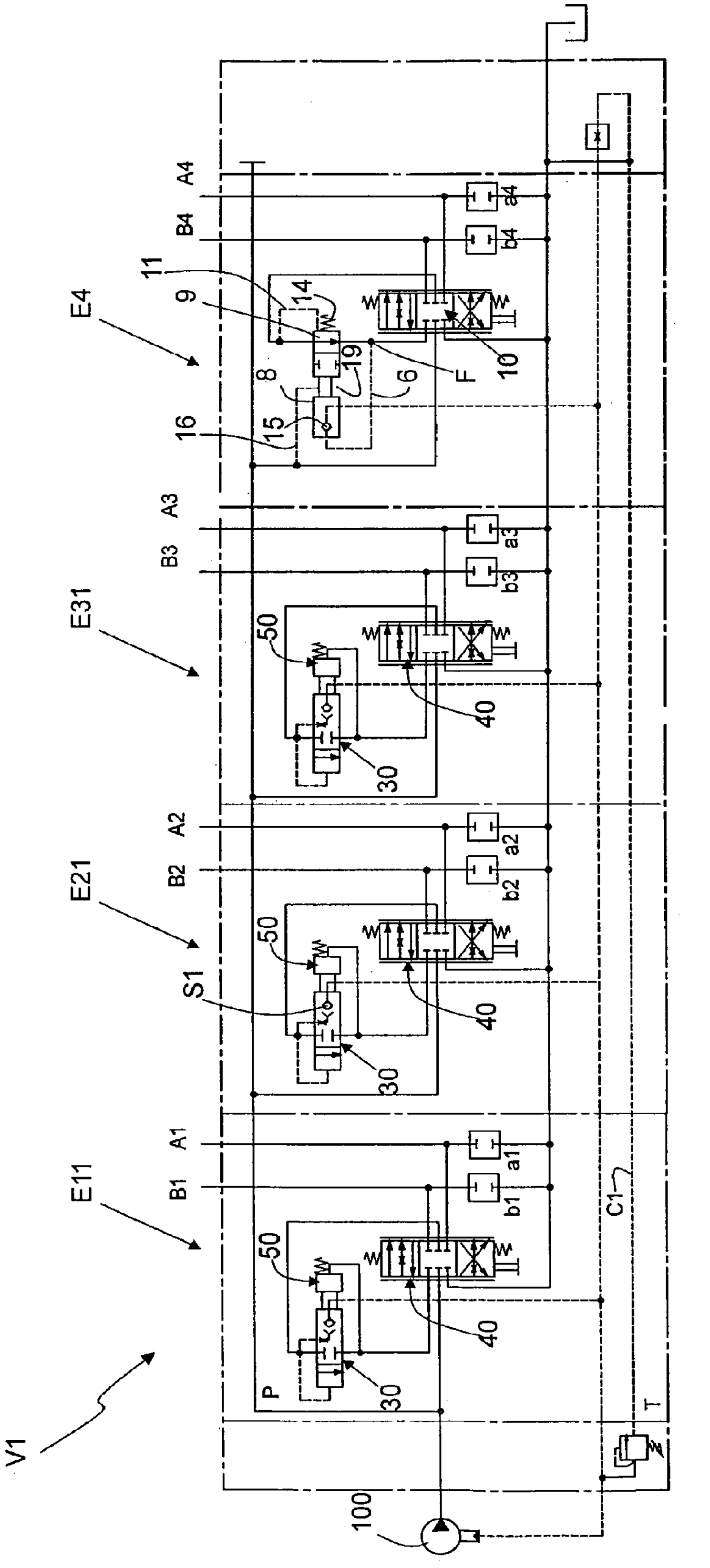
Figure 4:
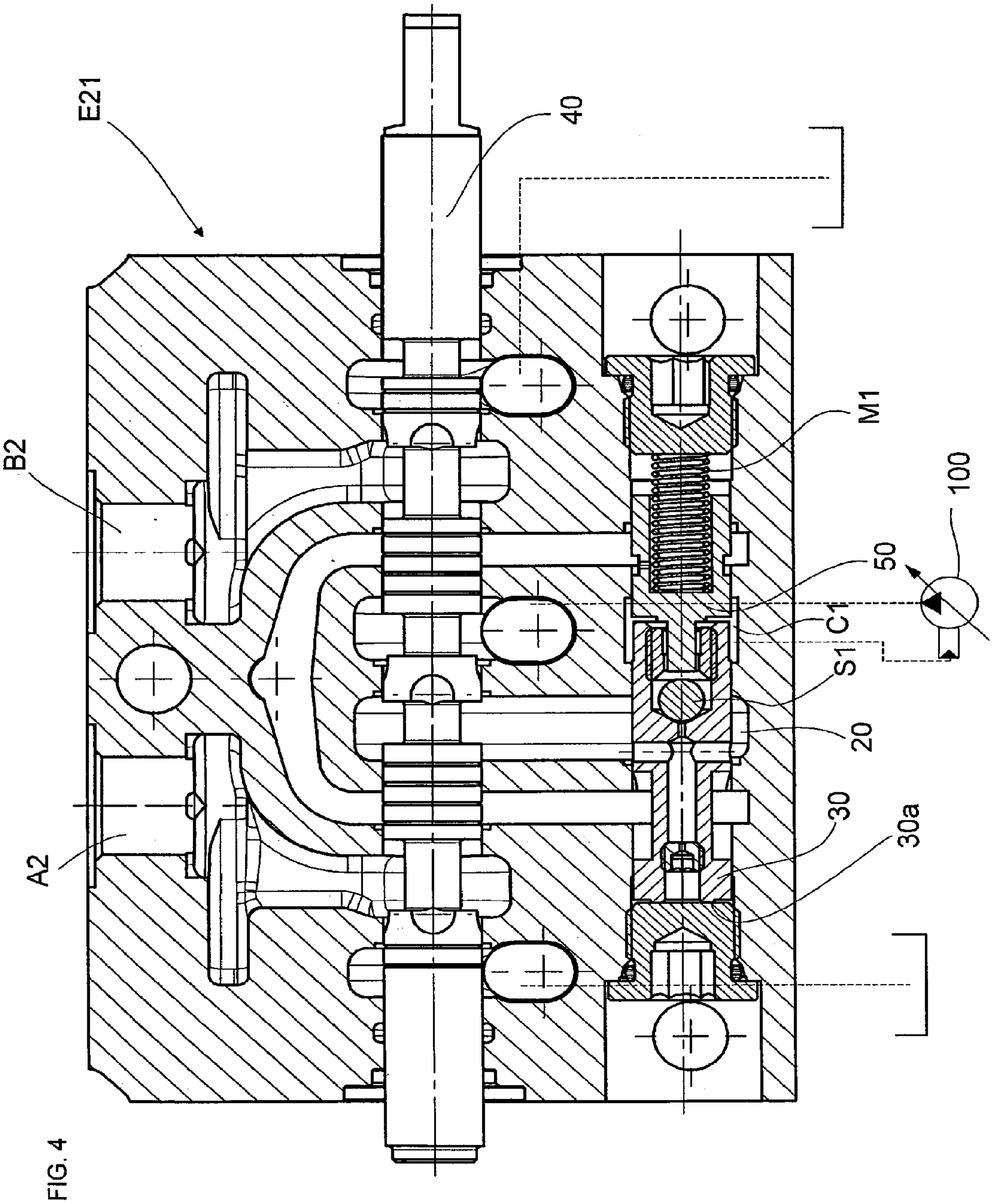
Figure 5:
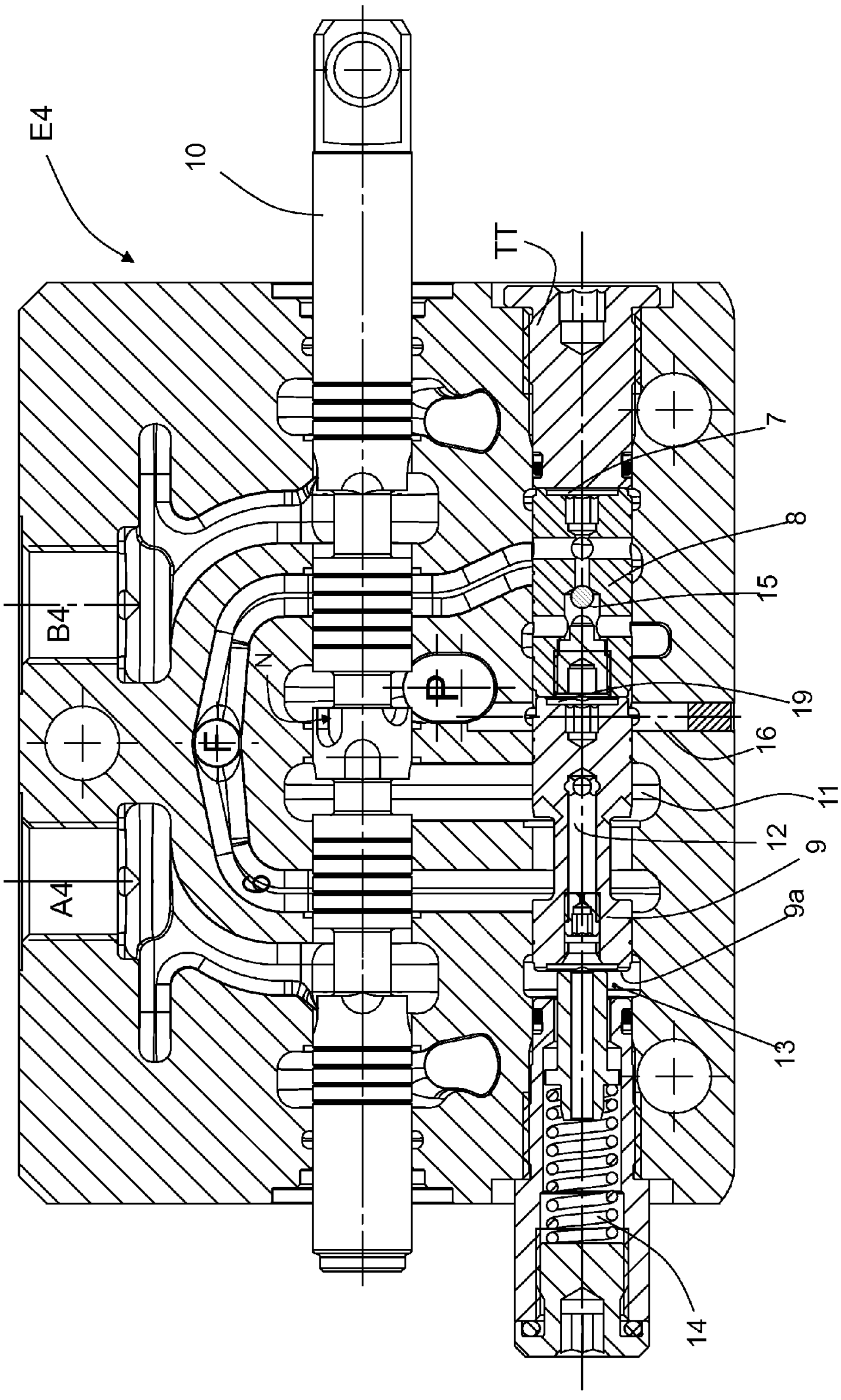

These and other features will be more apparent from the following description of a few embodiments, which are shown by way of example and without limitation in the accompanying drawings, in which:

FIG. 1 shows the hydraulic circuit of a prior art load sensing, flow sharing directional control valve, FIG. 2 shows a sectional view of an element of the load sensing, flow sharing directional control valve as shown in FIG. 1, FIG. 3 shows the hydraulic circuit of a directional control valve with one element not participating in flow-rate reduction, according to the present invention, FIG. 4 shows a sectional view of the elements of the directional control valve as shown in FIG. 3 which participate in flow-rate reduction under saturation conditions, FIG. 5 shows a sectional view of the element of the directional control valve as shown in FIG. 3 which does not participate in flow-rate reduction under saturation conditions.

Referring to FIGS. 2 and 1, there are shown by way of example, a sectional view of an element E of a load sensing flow sharing directional control valve and the hydraulic circuit of a directional control valve composed of three of such elements E1, E2, E3 respectively, according to a classical configuration, As used by the applicant hereof and as disclosed and claimed in patents EP1628018 and U.S. Pat. No. 7,182,097.

In this kind of directional control valve V, under multiple simultaneous actuation conditions, in the element that is at the higher pressure the compensator 3 and the piston 5 move all the way to the right while remaining in contact with each other.

As a whole, these two contacting components operate as a check valve and the piston 5, by mechanically pushing the ball S, causes pressure between the spool 4 and the pressure compensator 3 (pressure in point 2) to be supplied to the LS signal channel C; through channel C, the pressure in point 2, which is the higher, is transmitted to the pump P and to the other elements and moves apart the pressure compensator 3 and the piston 5 of the elements at lower pressure.

The piston 5 of the elements at lower pressure abuts on one side; the pressure compensator 3, being subjected to the LS pressure through channel C on one side and to the pressure between the spool 4 and the pressure compensator 3 (pressure in point 2) on the other side 3*a*, acts as a pressure compensator, thereby imparting to the point 2 of the element at lower pressure the same pressure as at the point 2 of the element that is at higher pressure.

Due to the above, all the elements E1, E2, E3 have the same pressure at point 2, downstream from the spool 4.

Furthermore, given the presence of a single channel, the elements E1, E2, E3 have the same pressure as the pump P upstream from the spool 4; as a result all the spools 4 are subjected to the same pressure differential, i.e. the one imposed by the pressure compensator 3 on the pump P.

The flow-rate through the spool 4 is the one required for generating the above pressure differential.

It shall be noted that the flow-rate delivered by the pump P is the one required for such differential to be maintained constant.

If the global flow-rate required by the various elements E1, E2, E3 exceeds the maximum pump P flow-rate (saturation condition), the pump is not able to provide a constant pressure differential, thereby causing a pressure drop.

Since the pressure differential is identical across all the spools 4, as explained above, under saturation conditions this differential decreases of the same amount across all the elements and also the flow-rate has a proportional decreases across all the elements.

This feature is particularly needed in those operating machines, such as excavators, that are required to perform many simultaneous movements, as it affords proper control of the moving machine even under saturation conditions, which occur quite often.

As mentioned above, amongst the various functions of a machine, one (e.g. turret rotation) might be required to maintain the same speed as before saturation, or anyway to be slowed down much less than the other functions: the prior art solution consists in simply providing a separate circuit for such function; while this solution is very simple it still involves high costs and large space requirements.

Particularly referring to FIGS. 3, 4 and 5, an explanation will be now provided about how the solution of this invention can fulfill the above need and solve the prior art disadvantages Particularly, in the four-element directional control valve V1 as shown in FIG. 3, an element E4, which will be referred herein as an element having priority, is modified as described below, whereby it does not participate in flow-rate reduction under, saturation conditions, while preserving the feature of maintaining a constant flow-rate to the user irrespective of the variation of the load.

The other elements E11, E21 and E31 operate under the same principle as shown in FIGS. 1 and 2 and as further described with the help of FIG. 4.

These elements include a proportional control spool 40 and, within the same lapped bore, a local compensator 30 that solves the function of pressure compensator and a piston 50, with a spring M1 of negligible force acting thereon; the piston 50 in turn mechanically operates on the pressure signal selector S1 by keeping it open or closed depending on the pressures on users.

The spring side M1 of the piston 50 is acted upon by the pressure of the user of its element, as taken between the local compensator 30 and the user itself, the side 30*a* of the local compensator 30 is acted upon by the pressure taken at point 20, i.e. between the spool 40 and the compensator 30, and the load sensing signal operates between the piston 50 and the local compensator 30.

In the element that is at the higher pressure, the piston 50 presses against the selector S1 of the local compensator 30 and the assembly of the compensator 30 in contact with the piston 50 operate as a one-way valve.

The selector S1 is kept open by the mechanical action of the piston 50 and connects the pressure signal of point 20, between the spool 40 and the local compensator 30, to the load sensing signal channel C1; such signal reaches the pump 100 compensator or alternatively the inlet cover compensator, and arrives between the local compensator 30 and the piston 50 of the elements at lower pressure.

Therefore, in the elements at lower pressure, the piston 50 and the compensator 30 are moved apart from each other; thus, the selector S1 closes and the local compensator 30 fulfills its pressure compensation function.

Referring to FIG. 5, the construction architecture of the element having priority E4 will be now described.

The element E4 is similar in construction to the above elements E11, E21, E31; the changes to be made to obtain the desired function include:

- replacement of the components 30, 50 and M1 with a spring 14, a local compensator 9 and a piston/load sensing signal selector 8;
- provision of a bore 16 in the body of the element E4, for connecting and transmitting the pressure signal received from the pump P between the local compensator 9 and the piston/selector 8 (chamber 19).

The local compensator 9 and the piston/selector 8 are in side-by-side positions within the same lapped bore; the local compensator 9 has a through hole therein, which forms the passage 12 and the piston/selector 8 incorporates a one-way valve 15, which justifies its being referred to as a "piston/selector".

The spring 14 operates on the side 9*a* of the local compensator 9 and the plug TT closes the lapped bore that contains these components.

It shall be noted also the presence of the following chambers delimited by the various components: a chamber 7 delimited between the plug TT and the piston/selector 8, a chamber 19 delimited between the piston/selector 8 and the local compensator 9, a chamber 13 interposed between the local compensator 9 and the spring 14.

Within the chamber 7, the piston/selector 8 is subjected to the pressure of the user; if such pressure rises above the pressure at P (excluding the effect of the spring 14), the piston/selector 8 is pushed against the compensator 9, which is in turn pushed to close the passage between P and the user, thus operating as a one-way valve.

The local compensator 9 is located downstream from the metering recess N of the spool 10 and, within the chamber 19, is no longer subjected to the LS signal pressure but to the pressure of the pump 100; on the opposite side, i.e. within the chamber 13, it is subjected not only to the pressure between the spool 10 and the compensator 9 (pressure at point 11) but also to the spring force 14, which is designed in such a manner as to generate, through the metering recesses N of the spool 10, a pressure differential suitably lower than the general pressure of the present directional control valve V1.

The above element E4 does not participate in flow-rate reduction under saturation conditions although it preserves the feature of maintaining a constant flow-rate to the user irrespective of the variation of the load; the latter feature will more clearly explained with reference to the following numerical example.

Considering the actuation of the element having priority E4: during the initial transient the pressure of the user, taken from the pipe 6 and higher than the pressure at P, reaches the chamber 7 on the side of the piston/selector 8 and pushes the latter against the compensator 9 thereby closing, as mentioned above, the passage between P and the user; the assembly of the compensator 9 and the piston/selector 8 thus operates as a one-way valve.

In the meantime, the pressure at P, which still corresponds to the stand-by value of the pump 100 (or of the inlet cover compensator) arrives, through the bore 16, between the compensator 9 and the piston/selector 8.

Once the compensator 9 has closed the passage between P and the user, the pressure at P propagates, through the actuated spool 10, to the chamber 11 and reaches, through the passage 12 within the compensator 9, the chamber 13 with the spring 14 therein.

Through the one-way valve 15 in the piston/selector 8, the pressure in the chamber 6 is transferred to the channel C1 and from the latter to the pump 100 compensator (or the inlet cover compensator) and further comes between the compensator 30 and the piston 50 of the other elements E11, E21, E31.

In response to the Load sensing signal pressure in C1, the pump 100 (or the inlet cover compensator) generates a pressure at P which is equal to that in the channel C1, increased by the differential pressure set by the compensator of the pump 100.

In this numeric example, the differential pressure set by the compensator of the pump 100 is assumed to be 14 bar and the action of the spring 14 is assumed to be bar.

With such pressure at P which, due to the above assumptions, is higher than pressure in C1 by 14 bar, the piston 8 abuts against the plug TT.

Therefore, on the side of chamber 19, the compensator is subjected to the pressure at P, and on the side of chamber 13 it is subjected to the pressure at P increased by the action of the spring 14; it will thus tend to move to the right, thereby opening the passage between the chamber 11 and the user.

As the passage between the chamber 11 and the user opens, a flow is generated through the spool 10; due to the pressure losses occurring in such flow, the pressure generated in the chamber 11 will be lower than P pressure by the value of such pressure losses.

Considering now the equilibrium of the compensator 9, this component is subjected to pressure at P on the side of chamber 19 and to pressure at 11 plus the action of the spring 14, i.e. 5 bar, on the side of chamber 13.

Thus, the compensator 9 will achieve equilibrium when pressure at 11 will be lower than the pressure at P by 5 bar, i.e. when the flow-rate through the spool 10 will generate a pressure drop of 5 bar.

The overall system will thus achieve equilibrium.

The pump 100 senses the load sensing signal pressure and imposes a 14 bar pressure increase at P, whereas the local compensator 9, before the signal to the pump 100 is taken at 6, suppresses 9 of the 14 bar, thereby reducing the actual pressure differential on the spool 10 to 5 bar.

It shall be noted that, assuming identical strokes of the spool 10, one flow only can generate 5 bar pressure loss regardless of pressures; the feature of constant flow irrespective of the variation of the load typical of load sensing valves is thus ensured.

The other standard elements E11, E21, E31 of the directional control valve V1, will be now assumed to be actuated, all being subjected to a pressure lower than that on the element having priority E4, and under non saturation conditions.

In these elements, the LS signal in C1 moves the compensator 30 and the piston 50 apart, whereas the selector S1 within the compensators 30 closes the connection between points 20 and the LS signal channel C1.

According to its known operation, the compensator 30 will impose on point 20 the same pressure as the LS signal existing in C1, thanks to its own equilibrium.

Due to the above these elements have the LS signal pressure at point 20 and the pressure corresponding to the LS signal pressure increased by the 14 bar differential in P, so the flow through the spools 40 will be the one required to generate a 14 bar pressure drop.

These actuations have no effect on the pressures operating in the element having priority E4 which will continue to operate as described above.

Assume now that at least one of the elements E11, E21, E32 is subjected to a pressure higher than the pressure of the element having priority E4; as explained above with reference to patent EP1628018, this element will generate the LS signal in the channel C1.

Such higher pressure reaches the piston 8 through the channel C1 and closes the one-way valve 15.

Nevertheless, this higher pressure, as shown in FIG. 5, does not affect the equilibrium of the compensator 9 nor the one of the piston 8 of the element having priority E4.

Therefore, the element having priority E4 is not influenced by the LS pressure generated by another element.

However, the higher LS signal that reaches the pump 100 (or the inlet cover compensator) generates a higher pressure value at P.

The increase of pressure at P with respect to that at point 11, would lead to a pressure drop through the spool 10 of the element having priority E4 and to a consequent flow reduction.

Nevertheless, such pressure increase at P with respect to the pressure at point 11 and hence at 13, also has an effect in the equilibrium of the compensator 9, which will tend to close the passage between point 11 and the user, thereby increasing pressure at point 11 itself.

This will occur until a new equilibrium condition is achieved, with the pressure at P being equal to the pressure at point 11 increased by the 5 bar spring action.

This means that the compensator 9 maintains a constant 5 bar pressure drop through the spool 10, and hence a constant flow-rate.

Assume now a saturation condition; this means that the pump 100 can no longer ensure the 14 bar pressure differential, it operates at full capacity and the differential decreases.

Assume also that the pressure differential drops to 10 bar and that the element having priority E4 is the one subjected to a higher pressure.

If the actuation of the standard elements E11, E21, E32 has led to saturation, the pressure at P is non longer equal to the LS signal pressure plus 14 bar, but is decreased to the LS signal pressure plus 10 bar.

Now, the reduction of the pressure at P with respect to that at point 11, would cause a pressure drop through the spool 10 of the element having priority E4 and, as a result, a flow-rate reduction; however, such reduction of the pressure at P with respect to the pressure at point 11 and thence at 13 also influences the equilibrium of the compensator 9, which will tend to open the passage between point 11 and the user causing a reduction of the pressure at point 11 itself.

The compensator 9 will continue to open the passage between point 11 and the user (and to reduce the pressure at point 11) until a new equilibrium condition is achieved, i.e. until the pressure at point 11 plus the 5 bar action of the spring 14 corresponds again to the pressure at P.

This means that, under saturation conditions, while in the elements E11, E21, E31 the pressure drop through the spool decreases from 14 to 10 bar (thereby causing a proportionally reduced flow-rate across all the elements), in the element having priority E4, the pressure drop is maintained constant at the value of 5 bar, therefore the flow-rate is maintained unchanged.

In the case the element having priority E4 is one of the elements at lower pressure, the system will behave in the same manner: as pressure decreases at P with respect to the pressure at point 11, the compensator 9 opens the passage between point 11 and the user until a new equilibrium condition is achieved, with the same 5 bar pressure drop.

The invention claimed is:

1. A sectional load sensing, flow sharing directional control valve (V1), comprising:

a valve body comprising plural sections (E1, . . . , E4), one said section (E4) comprising a local compensator (9), and a spool (10) with a metering recess (N), said local compensator (9) comprising a lapped bore defining a passage (12), i) a spring (14) in a first chamber (13) and operating on one side (9*a*) of the compensator (9) to close the lapped bore, and ii) a piston-load sensing signal selector (8);

an intermediate chamber (16) opposite the lapped bore, said local compensator (9) and the piston-load sensing signal selector (8) being in a side-by-side relationship within a common bore, said local compensator (9) being located on a downstream side of the metering recess (N) of the spool (10);

a load signal channel (C1) providing a load sensing signal pressure (LS);

a pressure chamber (11) extending between the spool (10) and the local compensator (9), the pressure chamber (11) having a pressure;

a pump (100) connected to said local compensator (9) and said spool (10), the pump (100) providing a pump pressure (P) and having a maximum pump flow-rate;

a pipe (6) connected to an end chamber (7) of the common bore, the pipe (6) providing a user load pressure (U) on one side of the piston-load sensing signal selector (8), wherein said local compensator (9) is subjected to the pump pressure and is not subjected to the load sensing signal pressure (LS) in the intermediate chamber (16), wherein the pressure of the pressure chamber (11), between the spool (10) and the local compensator (9), plus action of the spring (14), in the chamber (13), results in the spring (14) generating, through the metering recess (N) of the spool (10) a local pressure differential, the pressure at a downsteam side of the metering recess (N) being a stand-by pressure, the stand-by pressure being lower than the pump pressure (P);

a passage from the pressure chamber (11) providing a fluid flow, at a flow-rate, to a user load, wherein said piston-load sensing signal selector (8) comprises a one-way valve (15) subjected to:

i) the pump pressure coming into the intermediate chamber (16), on a first side of the piston-load sensing signal selector (8), and ii) the user load pressure (U), as provided by the pipe (6) to the end chamber (7), on an opposite second side of the piston-load sensing signal selector (8), and wherein said section (E4) has a feature of non participating in flow-rate reduction under saturation conditions when a global flow-rate required by the plural sections (E1, . . . ,E4) exceeds the maximum pump flow-rate of the pump (100), while maintaining the flow-rate of the fluid flow to the user load constant under a variation of the user load; and another section (E11, . . . , E31) comprising, in another common bore, a proportional control spool (40), a local compensator (30), a pressure signal selector (S1), a piston (50) mechanically acting on the pressure signal selector (51), and a spring (M1) acting on the piston (50).

2. A directional control valve (V1) as claimed in claim 1, wherein when the pressure from the pipe (6) at the end chamber (7) is higher than pump pressure (P) minus a resistance of the spring (14), the piston-load sensing signal selector (8) is pushed against the local compensator (9) and the local compensator (9) is in turn pushed to close a passage between the pump and the user load by operating as a one-way valve.

3. A directional control valve (V1) as claimed in claim 1, wherein, the local compensator (9) maintains a constant pressure drop through the spool (10) thereby maintaining the flow-rate of the fluid flow constant, the local compensator (9) being subjected on one side to the pump pressure (P) and on the other side to the pressure of the pressure chamber (11) increased by the action of the spring (14), and the local compensator (9) achieves equilibrium when the pressure of the pressure chamber (11) is lower than pump pressure (P) minus a constant pressure value of the spring (14) so that the flow-rate through the spool (10) will generate a constant pressure drop which is equal to the constant pressure value of the spring (14).

* * * * *